Aug. 27, 1957 J. SUNNEN 2,803,886
BORE GAGE WITH CORD ACTUATOR
Filed Jan. 20, 1955 6 Sheets-Sheet 1

INVENTOR
JOSEPH SUNNEN
BY George R. Ericso
HIS ATTORNEY

Fig. 5

Aug. 27, 1957  J. SUNNEN  2,803,886
BORE GAGE WITH CORD ACTUATOR
Filed Jan. 20, 1955  6 Sheets-Sheet 4

Fig. 6

INVENTOR
JOSEPH SUNNEN
BY George R. Ericson
ATTORNEY

Aug. 27, 1957

J. SUNNEN 2,803,886

BORE GAGE WITH CORD ACTUATOR

Filed Jan. 20, 1955

INVENTOR
JOSEPH SUNNEN
BY George R. Ericson
ATTORNEY

United States Patent Office 2,803,886
Patented Aug. 27, 1957

2,803,886

BORE GAGE WITH CORD ACTUATOR

Joseph Sunnen, Clayton, Mo.

Application January 20, 1955, Serial No. 482,970

14 Claims. (Cl. 33—178)

This invention relates to gages, and particularly to adjustable gages for comparing internal diameters. The invention is an improvement over gages of this type described in my co-pending applications, Serial No. 289,990, filed May 26, 1952, now Patent No. 2,735,188, and Serial No. 363,569, filed June 23, 1953.

An object of the present invention is to provide a generally new and improved adjustable comparator gage adapted to production gaging service which is particularly sensitive and stable and with which a considerable range of bore diameters can be rapidly and accurately compared to within twenty-five millionths of an inch (.000025") variation in diameter.

A further object is to provide a sensitive gaging device incorporating a novel and unique motion multiplication system in which friction is reduced to such negligible quantity that the system invariably returns freely and precisely to a zero position after being deflected therefrom in either direction.

A further object is to provide a unique means, particularly adaptable to gaging devices, for multiplying and converting a small linear movement to a large arcuate movement with a negligible amount of friction.

A further object is to provide a highly sensitive gaging device having a sensitive gaging finger and a plurality of multiplication steps, including a dial sweep hand, for multiplying slight movements of the gaging finger and for indicating them on a graduated dial, in which means is interposed between the multiplication steps for precisely adjusting the zero position and sweep of the indicator hand with respect to the dial graduations.

A further object is the provision of a three point adjustable bore gaging device wherein one point serves as a bore centralizer and moves in a fixed relationship with one of the other points upon adjustment thereof so as to maintain the other two gaging points precisely on the diameter of the bore, and in which means is provided for conveniently and accurately adjusting this relationship of the centralizer point with said other gage points.

A further object is to provide a highly sensitive gaging device having a multiple stage amplification system for highly amplifying slight movements of a sensitive gaging finger, wherein means is interposed between the amplification stages for damping oscillations in the system.

These and other objects and advantages, which became apparent when reading the following description in connection with the accompanying drawings, are attained in the present invention.

Figure 7:
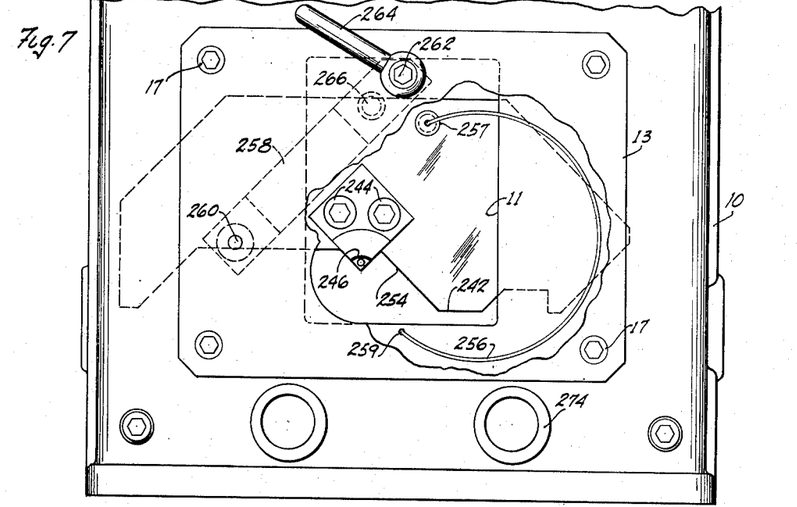
Fig. 7 is a full scale fragmentary front view of the lower portion of the front casing section with attached parts, and having a portion of the cover plate broken away for clearer illustration.

The gage mechanism is supported and enclosed in a rigid casing comprising similar front and rear half-sections 10 and 12 which are detachably connected by long cap screws 14. The two casing sections are provided with meeting flanges 16 at their open ends, in which alignment dowels 18 are carried to insure perfect alignment of the two casing sections upon assembly. The front and rear casing sections are each provided with rectangular openings 11, see Figs. 7 and 8, and cover plates 13, which are spaced from the walls of the casing sections by a rim 15 and attached to the casing sections by screws 17. The cover plates 13 are also provided with somewhat smaller access openings 19.

Figure 1:
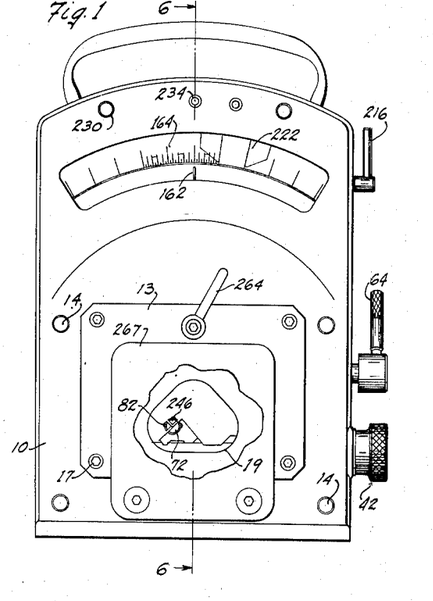
Fig. 1 is a half scale front elevational view of a gage constructed in accordance with the invention.
Figure 2:
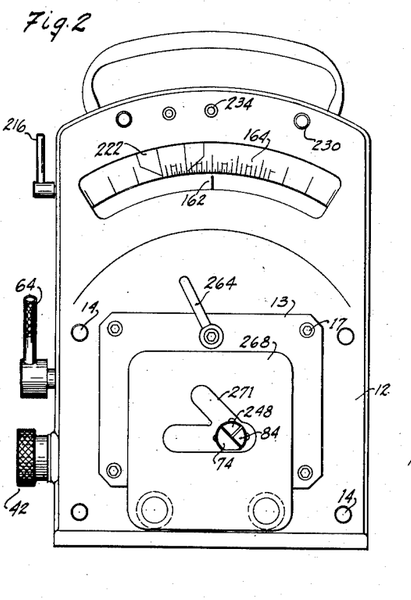
Fig. 2 is a rear elevational view of the gage shown in Fig. 1.
Figure 3:
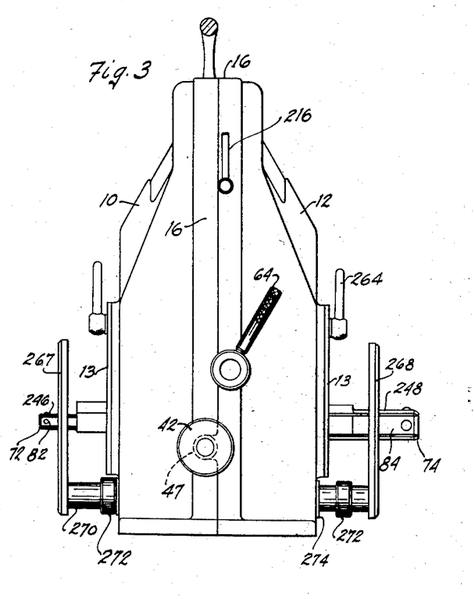
Fig. 3 is a right side elevational view of the gage shown in Fig 1.
Figure 4:
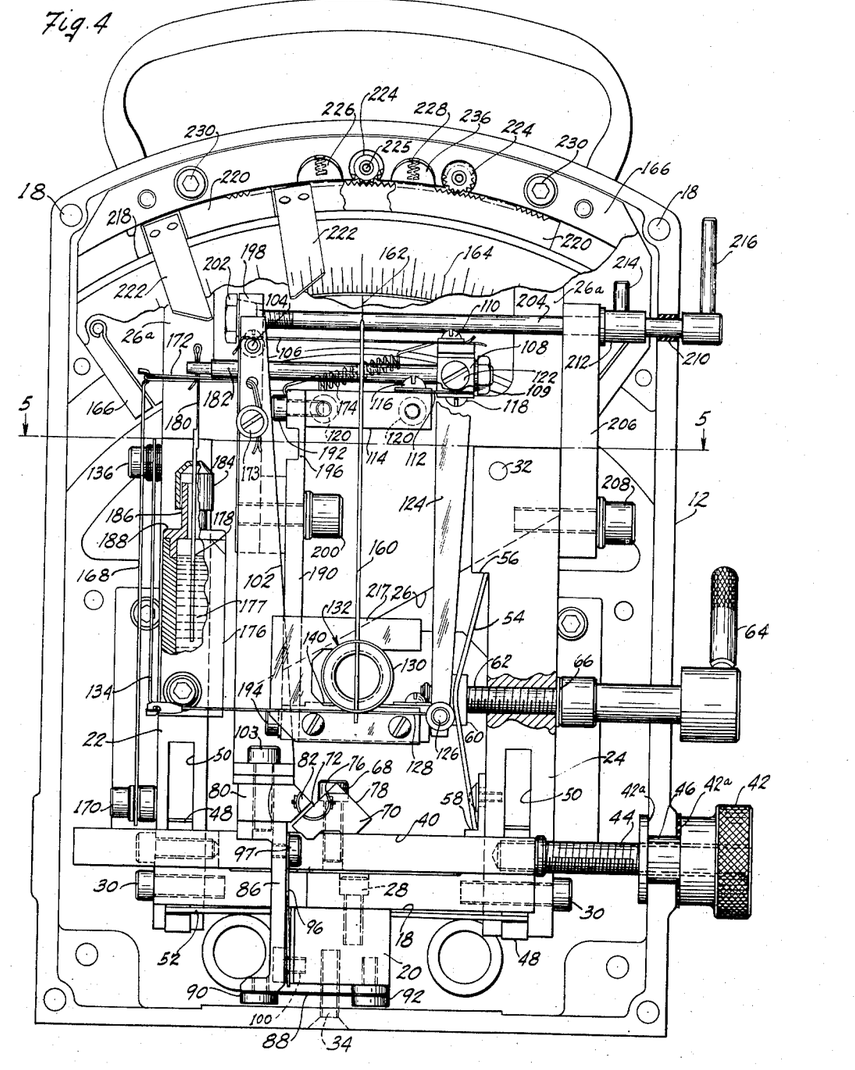
Fig. 4 is a full scale front elevational view of the gage shown in Fig. 1 with the front half of the casing removed and having some parts removed and other parts broken away and sectionalized for clearer illustration.
Figure 6:
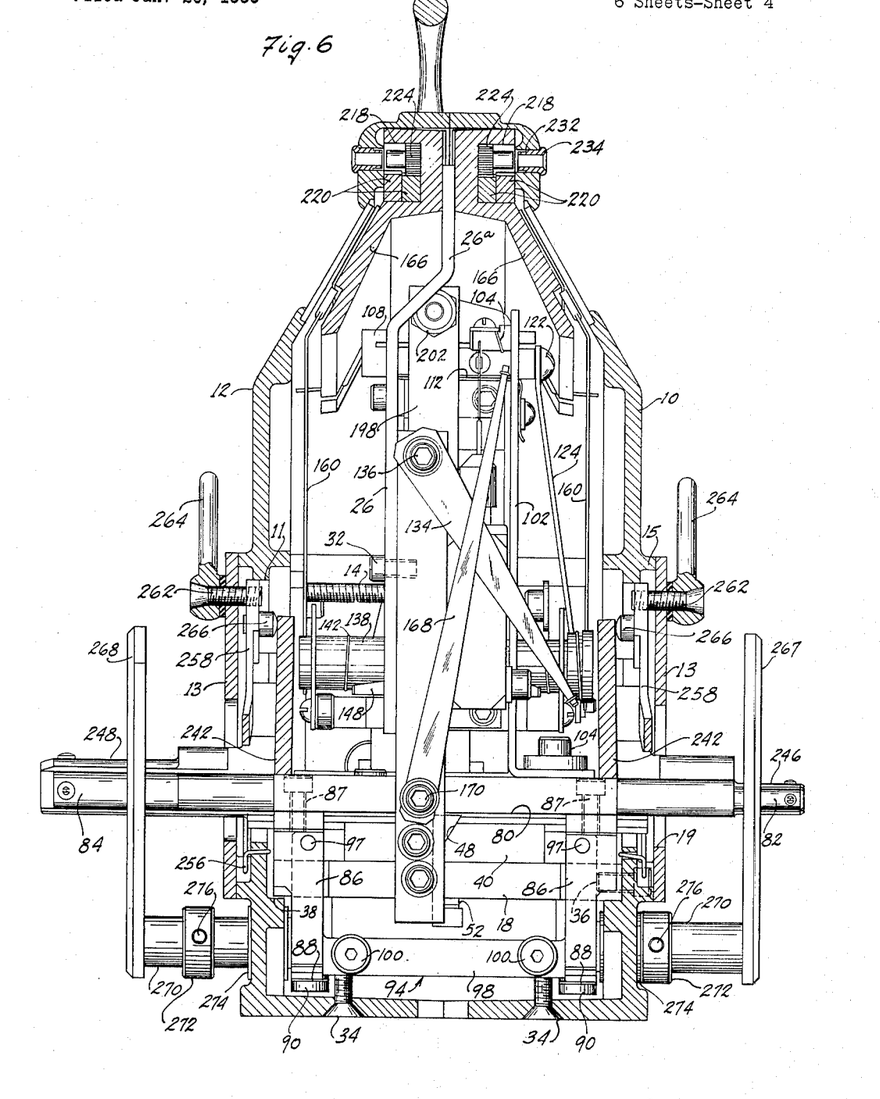
Fig. 6 is a full scale cross-sectional view cut through the casing on line 6—6 of Fig. 1, the interior mechanism being shown in full line for clearer illustration.

Within the casing is a support frame which comprises a stationary, horizontal plate member 18, see Figs. 4 and 6, a horizontal bar member 20 underlying the plate 18 and extending thereacross, a pair of vertical post members 22 and 24, and an upper tie plate member 26. The horizontal stationary plate 18 and the underlying bar 20 are rigidly connected by cap screws 28, the post members 22 and 24 are inlet at their lower ends into recesses in opposite edges of plate 18 and are rigidly attached to the plate by cap screws 30, and the tie plate is rigidly attached to the sides of posts 22 and 24 by cap screws 32.

This support frame is connected to the casing at a first point by countersunk head screws 34 which extend into the bar 20 and tie the frame to the bottom of the casing. At a second point, cap screws 36 rigidly connect the plate 18 at one edge to the front wall of the casing section 10, see Fig. 6, and the opposite edge of the plate 18 rests on support lugs 38 on the inside of the rear casing section 12. At a third point, upwardly extending portions 26a of the tie plate 26 are clamped between the casing sections.

Slidably mounted on the stationary plate 18 is a horizontal plate 40 which is adjustably positioned on plate 18 by an exterior, screw-threaded knob 42 which receives in threaded engagement a threaded stud 44, which stud is anchored in the plate 40. The knob 42 is restrained from axial movement by shoulders 42a which bear against opposite sides of the casing wall, and which are formed by the provision of a reduced diameter portion 46 which is received in a semicircular recess 47 in the flange of the front casing section 10.

The sliding plate 40 is held firmly downward against stationary plate 18 by gibs 48, which gibs are vertically slidable in slots 50 formed in post members 22 and 24, and these gibs are pressed downwardly against plate 40 by a leaf spring 52. In order to lock the sliding plate 40 in any adjusted position, a vertically arranged, formed leaf spring 54 is provided having its upper edge bearing against a shoulder 56 formed in post 24 and at its lower edge bearing against a vertically slidable wear shoe 58. At its center the formed leaf spring 54 is apertured and receives a shouldered nut 60, and the nut 60 receives a screw 62 which passes through the post 24 and is rotated by an exterior handle 64. The screw 62 has a clearance fit in post 24 and is restrained from axial movement inwardly by a shoulder 66 bearing against a face of post 24. As handle 64 is turned in one direction, the center of the formed spring 54 is moved toward alignment with its upper and lower edges and, as a result, a considerable force is applied downwardly on wear shoe 58 by this "toggle action," which achieves positive locking of the sliding plate 40 with a relatively small movement and moderate force applied at handle 64.

The sliding plate 40 carries rigidly attached to its upper surface by cap screws 68 a horizontal bar 70 of polygonal cross-sectional configuration which extends across plate 40, and which has extending therebeyond at each end and formed as an integral part thereof a semi-cylindrical gaging finger. One of these fingers, designated as 72, extends outwardly from the front face of the casing and the other, designated as 74, extends outwardly from the rear face of the casing. The bar 70 has a pair of adjacent upper surfaces 76 and 78 lying at an angle of 90° to each other and each lying at an angle of 45° to the sliding plate 40, see Fig. 4. The surface 76, it will be noted, coincides with the flat sides of the semi-cylindrical gaging fingers 72 and 74. Gaging fingers 72 and 74 will be referred to hereinafter as the adjustable gaging fingers.

Lying alongside and parallel with the bar 70 is a second, resiliently mounted, horizontal bar 80 which extends across plate 40, but is spaced slightly above the plate, and which has extending from each end thereof a gaging finger of quarter-cylindrical form. One of these fingers, designated as 82, coextends outwardly with gaging finger 72 from the front face of the casing, and the other finger, designated as 84, coextends with gaging finger 74 from the rear face of the casing. These gaging fingers 82 and 84 will be referred to hereinafter as the sensitive gaging fingers.

The bar 80 is rigidly connected at each end to the upper ends of a pair of rigid, vertical, support elements 86 by means of cap screws 87, see Fig. 6. The lower ends of the support elements 86 are carried on the free ends of a pair of horizontally arranged, thin, flexible reeds 88 and are connected thereto by cap screws 90. The reeds 88 are rigidly connected at their other ends to the horizontal support bar 20 by cap screws 92. It will be seen that, due to this mounting, the gage fingers 82 and 84 carried by bar 80 may be swung slightly toward and away from the adjustable gaging fingers 72 and 74. In order to support the considerable weight of the rigid members 80 and 86 and in order to constrain the movement of bar 80 and sensitive fingers 82 and 84 to a substantially horizontal movement, a second, vertically arranged, flexible reed, generally indicated at 94, is provided. The reed 94 is cut out of flat stock and has a general U form with a pair of vertical legs 96 which lie between the support members 86 and support block 20 and are connected to support members 86 at their upper ends by cap screws 97. The lower, horizontal, connecting portion 98 of the reed 94 is connected to the support block 20 by cap screws 100.

The slight horizontal movements of the sensitive gaging fingers 82 and 84 are highly amplified and indicated through a multiplication system which will now be described. This multiplication system includes a vertical arm 102 extending upwardly from bar 80, and which is rigidly attached at its lower end to horizontal bar 80 by a cap screw 103. The upper end of arm 102 has connected thereto at 104 one end of a flexible cord 106. The other end of cord 106 is connected to the upper surface of a rectangular, horizontal, rocking-bar 108 by a clamp screw 110. The rocking bar 108 is supported on an elongated, horizontally arranged, flexible reed 112. The reed 112 is fixed along one edge to a horizontal support block 114 by screws 116 and along its opposite edge to the lower surface of rocking-bar 108 by screws 118, whereby the horizontal bar 108 may be rocked about a horizontal axis. The support bar 114 is connected to the tie plate 26 by cap screws 120.

Figure 11:
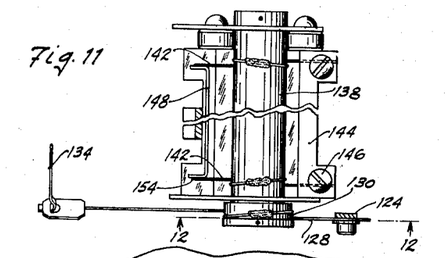
Fig. 11 is a plan view of the differential movement cylinder and associated parts.
Figure 12:
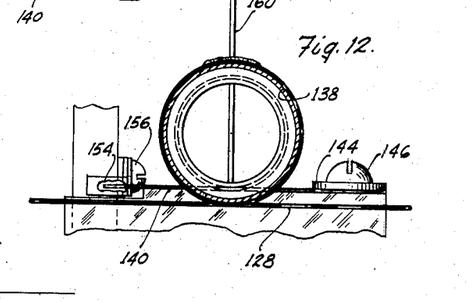
Fig. 12 is an enlarged sectional view taken on line 12—12 of Fig. 11.

Attached at its upper end to the rocking-bar by a screw 122 is a downwardly extending arm 124. The lower free end of arm 124 has connected thereto at 126, one end of a flexible cord 128. The cord 128 extends leftward from its point of connection with arm 124 and is wrapped once around the larger diameter portion 130 of a rolling cylinder which is generally indicated at 132. The cord 128 then extends leftward and is connected at its left end to the free end of a long leaf spring 134. The spring 134 is connected at its other end to the post 22 by a cap screw 136. The cylinder 132 also has a small diameter portion 138, see Figs. 5 and 11, which rests on and is arranged to roll on a platform 140. The cylinder 132 is constrained to roll without slippage on platform 140, whenever a rotational movement is applied thereto, by the provision of a pair of flexible tie cords 142. Each of the cords 142 extends in a single wrap around the smaller diameter portion 138 of the cylinder, and each has one end anchored under a clamp plate 144, held down by screws 146, and its other end attached to one end of a leaf spring 148.

The cords 142 and 128 are anchored to the periphery of the cylinder in any suitable manner as by cementing at 150 and 152 in order to preclude any slipping of the cords on the cylinder. The left ends of cords 142 may also be attached to the ends of the leaf spring 148 by cementing at 154. The leaf spring 148 is attached by a screw 156 to a vertical platform support member. At each end the cylinder 132 carries an indicator rod 160, which rods pass through the walls of the cylinder along the diameter of the cylinder. The indicator rods extend vertically upward from the cylinder and terminate in flattened ends 162 arranged to sweep the dial faces 164 on arcuate dial segments 166 which are mounted in the upper part of the casing.

The multiplication system further includes a long, vertically arranged, biasing leaf spring 168 attached at its lower end to post 22 by a cap screw 170 and connected at its upper free end to the upper portion of arm 102 by means of a flexible cord 172. The cord 172 is attached to arm 102 by a clamp screw 173. A biasing coil spring 174 is provided and has one end connected to the upper surface of rocking-bar 108 and its other end anchored to the support block 114. Both springs 168 and 174 oppose the tension of leaf spring 134.

In order to damp any oscillations which occur in the spring-tensioned multiplication system, a dash-pot device is provided, consisting of a reservoir 176 containing a highly viscous fluid 177 into which extends a vertically reciprocating rod 178. The rod 178 is connected by a flexible cord 180 to the free end of a horizontal rod 182, which rod at its other end passes through and is fixed to the horizontal rocking-bar 108 by a nut 109. The immersed rod 178 carries attached thereto a cap member 184 which reciprocates with the rod and freely fits over a hollow cylindrical extension 186 of a cover member 188 on the reservoir.

In order to nicely adjust the zero position and the swing of the indicator rods 160 with respect to the dial face, the platform 140 which supports the rolling cylinder is arranged to be swung horizontally a slight amount. This arrangement includes a vertical platform support member 190 which is connected at its upper end to support block 114 by cap screws 192. At its lower end the support 190 carries the platform 140 fixed thereto by cap screws 194. The support member 190 has an intermediate portion 196 of reduced cross-sectional area which considerably weakens the support member and permits flexing at that point, whereby the lower portion of the member and the attached platform may be swung slightly to the right and left.

In order to closely adjust the platform to the left or right, an upwardly extending, laterally disposed member 198 is provided and is rigidly attached at its lower end to platform support member 190 by a cap screw 200, and at its upper end, it is provided with a tapered hole which receives a tapered nut 202. The nut 202 in turn receives the threaded end of a horizontal adjusting screw 204. Screw 204 is supported and journalled in an upward extension 206 attached to post 24 by a cap screw 28, and it is further journalled in the casing wall at 210. To prevent inward axial movement of screw 204, a stop collar 212 is provided which bears against extension 206, and the stop collar carries a radial pin 214 which engages the upper casing walls to limit rotation of screw 204. Attached to its exterior end, the screw 204 carries a handle 216. As handle 216 is rotated in one direction, extension 198, the lower portion of support 190, and the platform 140 are moved toward the right with reference to Fig. 4, and when the screw is rotated in an opposite direction, the platform is swung toward the left, thus causing rolling cylinder 132 to roll slightly toward the right or left in order to adjust the zero position and swing of indicator rods 162 with respect to the dial graduations. The platform 140 is provided with end plates 217 which limit axial movement of the cylinder 132.

Any slight movement of sensitive gaging fingers 82 or 84, as for example, a slight movement toward the right of the finger 82 in Fig. 4, will be multiplied in a first stage by the ratio of the length of arm 102 from reeds 88 to the point of connection of cord 106 at 104, to the length of arm 102 from reeds 88 to fingers 82. In the second stage, the movement at 104, which is transmitted by cord 106 to the upper surface of bar 108, is further multiplied by the ratio of the distance from the rocking axis of bar 108 on reed 112 to the point of connection of cord 128 with arm 124 at point 126, to the distance from the rocking axis of bar 108 to the point of connection of cord 106 at 110. In the third stage, this movement at 126, which is now a leftward movement, will be further multiplied and converted to a desired arcuate movement by the action of the differential rolling cylinder 132, and in the fourth stage, this desired arcuate movement will be further multiplied by the ratio of the length of indicator rod 160 to the small diameter of cylinder 132.

The action of the differential rolling cylinder may be explained as follows: The leftward movement of point 126 on arm 124, to be referred to as "$y$," causes a clockwise rotation of cylinder 132, due to spring 134, which takes up any leftward movement "$y$." As the cylinder 132 rotates clockwise, the right-hand portion of cord 128 rolls up clockwise on the periphery of large diameter portion 130, designated as "$D$," an amount "$y$," and the left-hand portion of the cord 128 unrolls an equal amount. This clockwise rotation of the cylinder results in a clockwise or rightward rolling movement of the cylinder on the platform 140 on its small diameter, designated as "$d$," in a direction toward point 126. This amount of rightward linear movement of the cylinder, due to "$y$" movement, is referred to as "$z$." The net or actual leftward movement, therefore, of point 126 with relation to the cylinder will be "$y-z$." The relationship of the leftward movement "$y$" to rightward movement "$z$" may, therefore be expressed:

$$\frac{y}{z}=\frac{D-d}{d};\ y=\left(\frac{D-d}{d}\right)z;\ \text{and}\ z=y\left(\frac{d}{D-d}\right)$$

Figure 10:
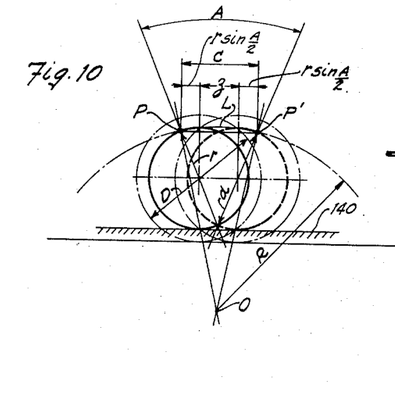
Fig. 10 is a diagrammatic view illustrating the operative positions of the rolling differential movement cylinder.

While cylinder 132 is rolling rightward on small diameter "$d$," a point "P" on the periphery of the small diameter portion 138 will generate an arc "$L$," see Fig. 10. This generated arc will be part of a common cycloid, and within the range of swing selected, which is something less than 45° both ways from a vertical position of indicator rods 160, this arc will have a radius "R" which can readily be determined. The chord "C" of this arc is equal to the horizontal linear movement $z$ of the cylinder plus $2r \times \sin \frac{1}{2}A$, where "$r$" equals the radius of the small diameter portion of the cylinder 138 and "A" equals the angular rotation of the cylinder resulting from a movement "$y$."

The precise length of arc "L" for a movement "$y$" can readily be determined from "R" and "A," but in order to simplify this description and to permit setting forth a simple relationship, it will be assumed that "$L$"=$2z$. This will be found to be a very close approximation, sufficiently close for the purpose of this description. The relationship of the length of arc "L" generated by a movement "$y$" may, therefore, be expressed:

$$\frac{y}{L}=\frac{D-d}{2d};\ y=\left(\frac{D-d}{2d}\right)L;\ \text{and}\ L=y\left(\frac{2d}{D-d}\right)$$

From this it will be seen that as "$D-d$" approaches zero, the multiplication factor increases. It will also be seen that the movement "$y$" at the end of long arm 124, which closely approaches a straight line, is substantially multiplied and converted to a desired arcuate movement with a minimum of friction.

The projection of point "P" on the periphery of the small diameter portion of the cylinder, by means of the indicator rods 160 lying on the diameter of the cylinder, will project the arc "L" along the diameter of the cylinder to the dial face, and the multiplication factor, due to this projection of points "P," will increase proportionately as the length of the rods increases with relation to small diameter "$d$." The arc generated by the ends of indicator rods 160 and, therefore, the dial arc will be a curtate cycloid, or more accurately, it will be the center portion of a curtate cycloidal curve included in an angle of 90° or less.

The arcuate dial segments 166 are provided with rectangular arcuate grooves 218, each of which slidably receives a pair of arcuate racks 220 lying face-to-face in the groove. Each rack carries attached thereto a translucent marker element 222 which extends radially across the dial face 164. A pinion gear 224 is provided for each rack and these gears are entered into spaced circular recesses above the grooves 218. The gears 224 are each provided with a central, hexagonal hole 225 to receive a turning key. In order to retain the racks and marker elements in an adjusted position, a semicircular spring-pressed button 226 is provided for each rack. These buttons are entered into spaced semicircular recesses above the grooves 218, and the buttons are pressed downward against the upper surfaces of the racks by springs 228, thereby to frictionally hold the racks in an adjusted position. The dial segments 166 are attached to the casing by cap screws 230 which pass through the casing sections and dial sections. Access holes 232 and trim grommets 234 are provided in the casing sections 10 and 12 for insertion of an operating key.

Figure 8:
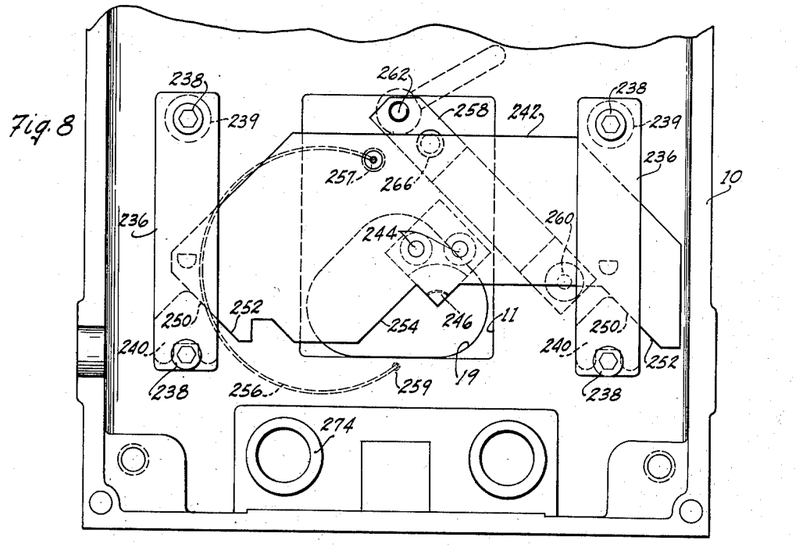
Fig. 8 is a back or inside view of the casing section shown in Fig. 7.
Figure 9:
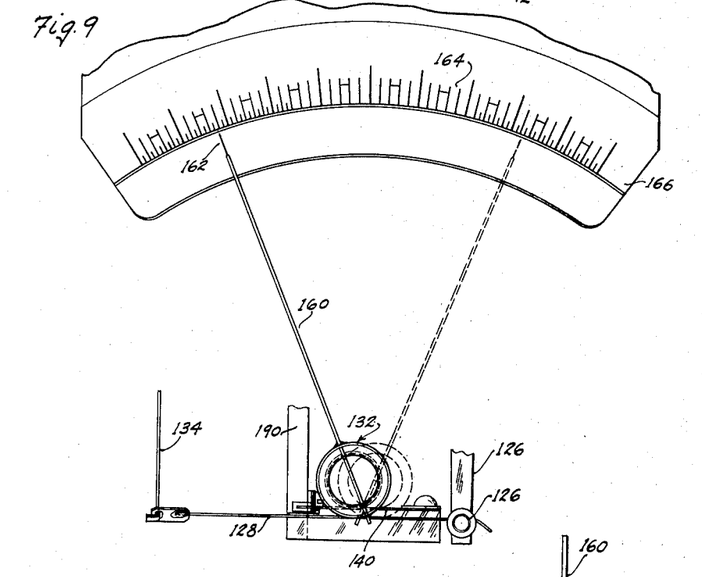
Fig. 9 is a schematic view showing the dial and elements of the differential movement multiplication stage.

Attached to the inner front wall of both front and rear casing sections is a pair of spaced, vertically arranged guide straps 236, see Fig. 8. Members 236 are attached to the casing walls by screws 238 and are spaced from the casing walls by upper lugs 239 and lower lugs 240, which lugs are preferably cast integral with the casing sections. Extending between the inner wall of the casing and guide members 236 on each casing section are the ends of plate members 242. Plates 242 are slidable vertically and horizontally between the casing walls and the guide members, and each plate carries rigidly attached thereto by screws 244 a quarter-cylindrical gaging finger. These fingers, designated as 246 and 248, will be referred to hereinafter as the centralizer fingers. These fingers extend outwardly of the casing in parallel relationship with the sensitive fingers and adjustable fingers and are arranged to form therewith a substantially complete cylinder, that is, when they are in their most closely adjusted positions. Each of the fingers is provided with a hardened gaging point near its outer end, as indicated.

The lower spacing lugs 240 in the inner casing walls each have surfaces 250 which lie at an angle of 45° to the horizontal and are parallel to each other, and the horizontal bar 70, see Fig. 4, which carries the adjustable gaging fingers and which lies between these lugs, has a surface 78 which also lies at an angle of 45° to the horizontal, but at 90° to the lug surfaces 250. The lower edges of plates 242 have a pair of spaced surfaces 252, one near each end of the plate, which are parallel with and bear on lug surfaces 250, and each plate has an intermediate surface 254 on its lower edge which is parallel with and in engagement with surface 78 on bar 70, but which lies at 90° to the spaced surfaces 250 and 252. The slidable plates 242 are biased in a downward direction by gravity and by C-shaped springs 256 anchored at one end in hollow pins 257, located at the upper edges of the plates, and at their other ends in the casing wall at 259. The manner of connection of springs 256 and their form is such as to impart some outward biasing force to the upper portion of the plates; that is, the upper edges of plates 242 are biased toward the inner walls of the casing.

In order that plates 242 may be freely slidable, the space between the casing walls and guide elements 236 is made slightly greater than the thickness of the plates. This clearance will, of course, permit a slight tilting movement of the plates with respect to a vertical plane and, consequently, a somewhat amplified movement at the outer ends of the perpendicularly attached centralizer fingers 246 and 248 with reference to a horizontal plane. Normally, in gaging, the work is supported on the centralizer finger, and the weight of the work, plus the biasing of spring 256, always assures that this free movement will be taken up in the same direction and the centralizer fingers will, therefore, always assume the same position relative to the sensitive and adjustable fingers when gaging. It is desirable, however, to have a convenient means for closely adjusting the position of the centralizer finger with respect to the sensitive and adjustable gaging fingers to compensate for any slight wearing of the gaging points so as to insure that the gaging points of the three fingers of each group will always lie precisely on a circle. To accomplish this, flexible strap members 258 are provided which are attached at one end to the casing cover plates 13 by screws 260 and at their other ends receive in threaded engagement screws 262.

These straps 258 occupy the space between the exterior casing walls and cover plates 13, and the screws 262, which are provided with exterior handles 264, pass through clearance holes in the cover plates 13. The straps 258 are provided with buttons 266 which engage the outer faces of plates 242 near their upper edges. As the handle 264 is turned in one direction, the upper edge of plate 242 is moved inwardly, this raises the outer end of the centralizer finger attached thereto, and when turned oppositely, the outer end of the centralizer finger will move downward due to the bias of spring 256.

Figure 5:
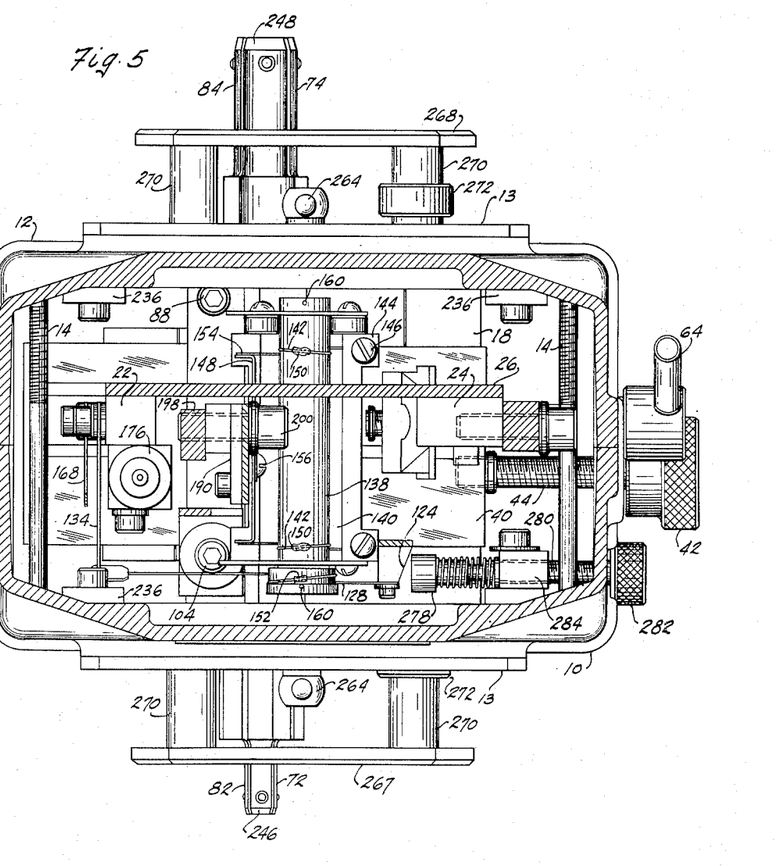
Fig. 5 is a full scale cross-sectional view taken on line 5—5 of Fig. 4.

The gage is further provided with a pair of horizontally slidable gaging plates 267 and 268 mounted on the ends of a pair of horizontal slide rods 270. These plates are arranged perpendicular to the gaging fingers and are attached to the ends of the slide rods 270. The plates 267 and 268 are provided with limited central openings 271 which permit the gaging fingers to pass through when in their various adjusted positions. The slide rods are provided with adjustable stop dogs 272, and the rods pass through the casing walls and are slidably mounted in bushings 274 in the front and rear walls of the casing. The adjustable stop dogs 272 are provided with set screws 276. Referring to Fig. 5, an adjustable stop member is provided to limit the swing of arm 124 in a rightward direction. The stop includes a spring-pressed, non-metallic bumper element 278 slidable on a screw 280, which screw passes through the casing wall and has an exterior knurled knob 282 thereon. A block 284 mounted on the interior of the casing wall receives the screw 280 in threaded engagement so that, as the knob 282 is turned, the position of bumper element 278 is adjusted.

*Operation*

When it is desired to compare the bore of a work piece with a known bore such as a master ring gage, the gage locking handle 64 is first turned in a direction to release the tension on spring 54 and thereby release the downward pressure on the sliding plate 40. The knurled knob 42 is then turned in a direction to move the adjustable gaging finger sufficiently close to the sensitive finger to permit the ring gage to readily pass over the gaging points. As the sliding plate 40 is moved horizontally to move the adjustable gaging finger attached thereto, the sliding plates 242, due to the engagement of their surfaces 254 with the surface 78 on bar 70, will be caused to slide in a fixed relationship with the horizontal movement of plate 40. This movement of sliding plates 242 is along a line lying at 45° to the movement of plate 40, and, consequently, the centralizing fingers 246 and 248 will be caused to move along the same path. Inasmuch as the centralizer gaging point lies midway between and above the gaging points on the sensitive finger and adjustable finger, and on a circle with these two gaging points, the centralizer point will always be maintained precisely on a circle with the other two gaging points as the adjustable gaging finger is adjusted horizontally.

The selection of which group of gaging fingers is to be used in gaging the work piece will, of course, depend upon the diameter of the bore to be compared. The group of fingers projecting from the face of casing section 10 and comprising fingers 72, 84, and 246 are adapted to gaging very small bores, and their range of adjustment outward overlaps somewhat the range of adjustment of the group of fingers extending from casing section 12, which comprise gaging fingers 74, 84, and 248, the range of which is adapted to comparing larger bores.

Having placed the master ring gage over a set of gaging fingers, the knob 42 is then turned in a direction to spread the gaging fingers until contact of the gaging points is made with the bore. When contact is made, the sensitive gaging finger will be deflected slightly and this deflection will be clearly indicated on the dial face on 64. The adjusted position of finger 72 or 74 may now be locked by turning handle 64 to a locking position. The position of indicator 162 may then be adjusted with respect to any particular zero point on the dial by turning handle 216. This action causes the platform 140, suspended on support member 190, to be swung slightly to the right or left, thereby causing the cylinder 132 to roll to the right or left until the dial pointer 162 is moved to a desired zero point on the dial. If it is desired to establish a quick sight tolerance range on opposite sides of this selected zero point, a key is inserted in the pinion gears 224 and the translucent markers 222 are moved to the desired positions on opposite sides of the zero point.

If it is desired to gage the bore of a work piece at any particular point along its axis, or if it is desired to check the uniformity of the bore of a work piece along its length, the stop dogs on slide rods 270 are adjusted so as to position the gaging plates 267 and 268 or limit the range of movement of these gage plates to that desired. The work piece is then placed against the gaging plate, and the gaging points are then positioned as desired, axially in the bore of the work piece, while held firmly against the gaging plate, or the work piece may be moved axially along the gaging fingers to check the uniformity of the bore.

The walls of the rolling cylinder 132 are made quite thin, and both the cylinder and the attached indicator rods are constructed of a very light material, such as a magnesium alloy, so as to reduce their weight to a very minimum in order to reduce rolling friction on the platform to a negligible quantity and to reduce the mass of those parts in the system which have the greatest movement. The cords 128 and 142 are sufficiently flexible so as to introduce no measurable resistance to flexing in conforming to the cylinder. Due to the fact that the elements at the outer end of the system having the greatest movement are made extremely light, a tendency is indicated for sustained oscillations of objectionable amplitude at the ends of the pointer rods to occur whenever the device is jarred or whenever a rapid movement is imparted to the sensitive gaging finger. This tendency is met and completely overcome by the provision of the dash-pot device, which acts at a point in the system between the cylinder 132 and the return springs 174 and 168, and by close calibration of long spring 134 at the outer end of the system with relation to the return springs.

It will be seen that with the exception of the rolling contact of the light cylinder on the platform and the wrapping and unwrapping of the flexible cords on the cylinder, there is a complete absence of friction due to the relative movement of parts in contact in the entire multiplication system. The only other friction occurring may be considered as molecular friction occurring within the material of the reeds, the cords, and the viscous liquid in the dash-pot, and this friction may be regarded as constant for the present purpose.

Variations and modifications of the described construction, which lie within the spirit of this invention, will occur to those skilled in this art. The purpose of the foregoing description is, therefore, intended to be illustrative and not limiting, the scope of the invention being set forth in the appended claims.

I claim:

1. In a device for amplifying small linear movements and indicating them on an arcuate dial, a spring-pressed sensitive element, a flat support surface, a rolling member consisting of two concentric, arcuate portions of different radii, said member being arranged to roll on said surface on one of said arcuate portions and said other arcuate portion of different radius being spaced from said surface, an indicator arm connected to and extending radially from said member, an arcuate dial face arranged to be swept by the outer end of said arm as said member is rolled on said surface, and a motion transmission member operatively connected to said sensitive element and acting tangentially on said other arcuate portion to cause said member to roll on said surface when said sensitive element is moved.

2. In a sensitive gaging device, a flat support surface, a sensitive gaging finger including connecting means movable along said support surface, a rolling element consisting of two concentric, arcuate portions of different radii, said element being constrained to roll on said surface, on its smaller arcuate portion, in a direction perpendicular to its axis, said larger arcuate portion being spaced from said surface, an indicator arm connected to said element and extending radially therefrom, an arcuate dial arranged to be swept by the free end of said arm as said element rolls on said surface, means biasing said element in one rotational direction, and means including a flexible cord operatively connected at one point to said element and extending circumferentially therefrom on said larger arcuate portion and then extending tangentially from said larger arcuate portion and parallel with said surface to a connection with said connecting means for causing said element to roll on said surface as said sensitive gaging finger is moved.

3. In a gaging device, a horizontal support surface, a rolling element consisting of two concentric, cylindrical portions of different diameters, said element being constrained to roll on said surface on the smaller diameter cylindrical portion in a direction perpendicular to its axis, the larger diameter cylindrical portion of said rolling element being spaced from said surface, an indicator arm connected to and extending radially from said element, an arcuate dial arranged to be swept by the free end of said arm as said element rolls on said surface, a flexible cord wrapped around said larger diameter cylindrical portion and having end portions extending oppositely and tangentially from said element and parallel with said surface, means to prevent the slipping of said cord on said element, resilient means acting oppositely on the end portions of said cord to maintain tension thereon, and a sensitive gaging finger having an operative connection with one end portion of said cord.

4. A device as set forth in claim 3 in which the means constraining said rolling element to roll on said surface in a direction perpendicular to its axis comprises a pair of flexible cords each having an intermediate portion extending in a wrap around said smaller diameter portion at spaced points therealong and each having end portions extending oppositely and tangentially from said small diameter portion and parallel with said platform to fixed ends.

5. A device as set forth in claim 3 in which said flexible cord is fixed at one point to the periphery of said larger diameter portion to prevent slipping.

6. In a device for amplifying small movements and indicating them on a dial face, an adjustable member having a flat surface and being arranged for adjustment in the plane of said surface, a rolling element comprising two concentric, cylindrical portions of different diameter, said element being constrained to roll on said surface, on its smaller diameter portion, in a direction perpendicular to its axis, an indicator arm connected to said element and extending radially therefrom, an arcuate dial face arranged to be swept by the end of said arm as said element rolls on said surface, a flexible cord wrapped around the larger diameter cylindrical portion of said rolling element and having end portions extending oppositely and tangentially from said portion and parallel with said surface, means to prevent slipping of said cord on said element, resilient means acting oppositely at the end portions of said cord to tension it, a sensitive member having an operative connection with one end portion of said cord whereby said element is caused to roll when said sensitive member is moved, and whereby said element is caused to roll when said adjustable member is moved thereby to change the relationship of the rolling element and sensitive member.

7. In an internal diameter gage, a group of three gaging fingers having contact points arranged on a circle, the first of said fingers being a sensitive gaging finger resiliently mounted for slight horizontal movement along the diameter of the circle, the second being adjustable horizontally along the diameter of the circle with respect to the sensitive finger, and the third being jointly adjustable with the second along a line lying at 45° to the horizontal, means to amplify and indicate the slight movements of said sensitive finger including a horizontal platform arranged to be horizontally adjustable, a rolling element having two concentric, cylindrical portions of different diameter and being arranged to roll on said platform on its smaller diameter portion, an indicator arm connected to and extending radially from said element, an arcuate dial arranged to be swept by said arm as said element rolls on said surface, a flexible cord wrapped around said larger cylindrical portion and extending oppositely and tangentially from said element parallel to said platform, and tensioned at its opposite end portions by oppositely acting resilient means, one end portion of said cord being operatively connected with said sensitive gaging finger, and means for adjusting said platform.

8. In an internal diameter gage, a group of three gaging fingers having contact points arranged on a circle, the first of said fingers being a sensitive gaging finger resiliently mounted for slight horizontal movement along the diameter of the circle, the second being adjustable horizontally along the diameter of the circle with respect to the sensitive finger, and the third being moved jointly with the second, but along a line lying at 45° to the horizontal, thereby to maintain said three gaging points on a circle, means for amplifying the slight movements of said sensitive finger for indication on a dial comprising a balanced system including a plurality of multiplication stages, and means interposed between said stages for damping oscillations in said system.

9. In an internal diameter gage, support structure, a group of three horizontal gaging fingers carrying contact points near their outer ends and being arranged to contact a circle at three points, said group comprising a sensitive gaging finger resiliently mounted for slight horizontal displacement, an adjustable gaging finger spaced horizontally from said sensitive finger and being arranged for horizontal adjustment along the diameter of the circle, and a centralizer finger arranged between and above the other two and being carried at its inner end by a vertical member, said vertical member being guided in said support structure for free horizontal and vertical sliding movement in a vertical plane and being free to tilt slightly in a vertical plane, a cam surface movable with said adjustable finger in engagement with a surface on said vertical member for causing said vertical member and said centralizer finger to be moved along a path lying at an angle of 45° to the horizontal as said adjustable finger is moved horizontally, resilient means for tilting said vertical member with respect to a vertical plane in a direction to lower the outer end of said centralizer finger, and screw-threaded means carried in said support structure for adjustably tilting said vertical member in an opposite direction thereby to raise the outer end of said centralizer finger.

10. In an adjustable internal diameter gage, a group of three horizontally projecting gaging fingers carrying contact points near their outer ends and being arranged to contact a circle at three points, one of said fingers being a centralizer finger for maintaining the other two gaging fingers precisely on the diameter of a bore, said centralizer finger being connected at its inner end to a vertical member arranged to be freely slidable and to be free to tilt slightly in a vertical plane, means movable with one of said other fingers for moving said vertical member and said centralizer finger in a direction to maintain said three fingers on a circle, resilient means for tilting said vertical member with respect to a vertical plane in one direction, and screw-threaded means for adjustably tilting said vertical member in the opposite direction, thereby to adjustably position the outer end of said centralizer finger with respect to said other two fingers.

11. In an internal diameter gage, a group of three parallel, horizontal gaging fingers having contact points near their outer ends arranged to contact a circle at three points, one of said fingers being resiliently mounted for slight horizontal displacement along the diameter of the circle, a second of said fingers being adjustable horizontally along the diameter of the circle, and a third finger disposed midway between and above said other two fingers, a movable member rigidly connected to the inner end of said third finger and having an operative connection with said second finger for causing said member and said attached third finger to be moved along a line at 45° to the horizontal as said second finger is adjusted horizontally, and screw-operated means acting on said movable member in a direction to adjustably tilt it so as to raise or lower the outer end of said third finger.

12. In an internal diameter gage, a group of three horizontal gaging fingers arranged to contact a circle at three points, one of said fingers being a sensitive finger resiliently mounted for slight horizontal displacement, another of said fingers being spaced horizontal from said first finger and being arranged for horizontal adjustment along the diameter of the circle, and the third finger being arranged between and above the other two, means including cooperating cam surfaces movable with said horizontally adjustable finger and said third finger for causing said third finger to be moved along a path lying at 45° to the horizontal as said adjustable finger is moved horizontally, and means for amplifying and indicating slight horizontal displacements of said sensitive finger including a cylinder having a portion arranged to roll in a fixed path on a horizontal surface and having a portion of larger diameter spaced from said surface, an indicator rod connected to and extending radially from said cylinder, an arcuate dial arranged to be swept by the free end of said rod, and a flexible cord having a wrap around said larger diameter portion and extending oppositely and tangentially from said cylinder and parallel with said platform, one of said extending cord portions having an operative connection with said sensitive finger, and the other of said extending cord portions being connected to resilient means acting in a direction to hold said cord taut.

13. In a gaging device, a casing having opposite front and rear vertical gaging faces, a group of three horizontal gaging fingers projecting from each face of the gage, two of the fingers of the groups being formed with its corresponding oppositely projecting finger as a continuous member extending through said casing, the third fingers of each group being independently mounted on vertically slidable plates slidably arranged in the respective adjacent walls of the casing, one of said continuously formed members being resiliently mounted to permit slight horizontal displacement and the other of said continuously formed members being horizontally adjustable, and means including a cam surface on said adjustable continuous member cooperating with surfaces on said vertical plates for causing said third fingers to be moved along a path of 45° to the horizontal as said horizontally adjustable fingers are moved horizontally.

14. In a gaging device, a resiliently mounted gaging finger, a lightweight, circular element arranged to roll on a surface, said element having a lightweight indicator arm extending therefrom, an operative connection between said resiliently mounted gaging finger and said element including a flexible cord wrapped around said element for causing said element to roll on said surface as said sensitive finger is moved, and a dash-pot damping device acting to damp oscillations of said element.

References Cited in the file of this patent

UNITED STATES PATENTS

| | | |
|---|---|---|
| 23,564 | Gould | Apr. 12, 1859 |
| 1,530,067 | Young | Mar. 17, 1925 |
| 1,723,390 | Tingley | Aug. 6, 1929 |
| 2,159,343 | Poock et al. | May 23, 1939 |
| 2,197,198 | Street | Apr. 16, 1940 |
| 2,580,227 | Hoover | Dec. 25, 1951 |
| 2,650,432 | Adams | Sept. 1, 1953 |

FOREIGN PATENTS

| | | |
|---|---|---|
| 119,249 | Sweden | May 14, 1947 |